April 10, 1945.　　A. H. WESTBERG　　2,373,365
AIRCRAFT STRUCTURE (WING FLAP MECHANISM)
Filed Dec. 19, 1941
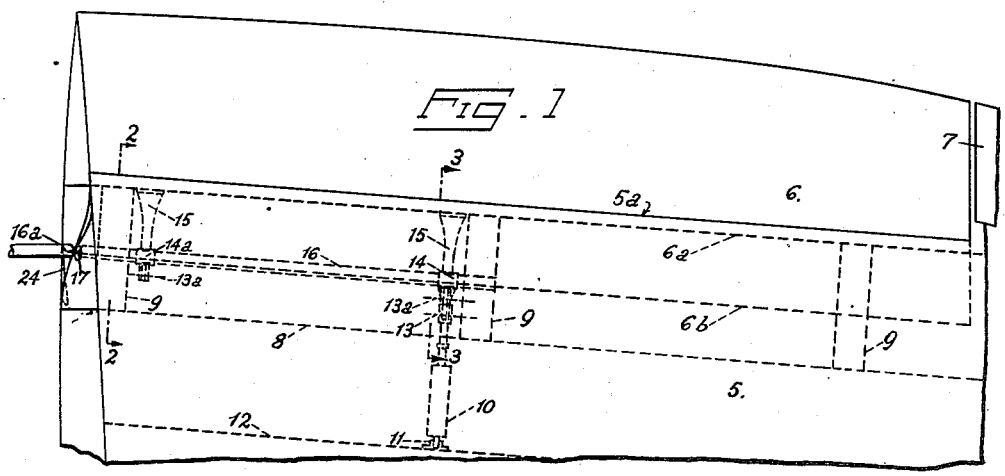
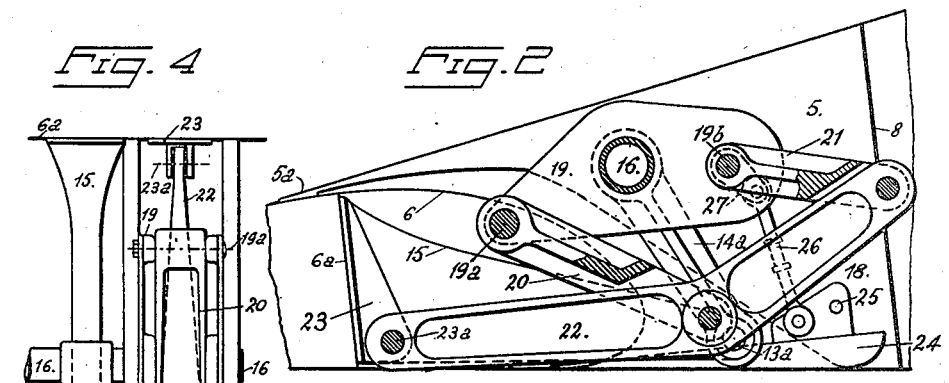
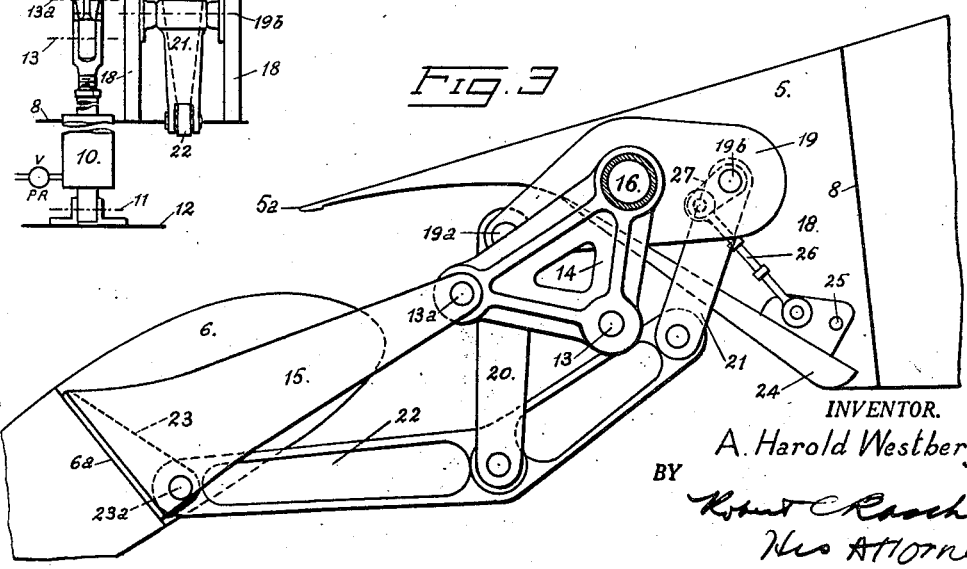
INVENTOR.
A. Harold Westberg
BY
His Attorney.

Patented Apr. 10, 1945

2,373,365

UNITED STATES PATENT OFFICE 2,373,365

AIRCRAFT STRUCTURE (WING FLAP MECHANISM)

Arthur Harold Westberg, Baldwin, N. Y., assignor to Republic Aviation Corporation, a corporation of Delaware Application December 19, 1941, Serial No. 423,659

7 Claims. (Cl. 244—42)

This invention relates to aircraft wings provided with airfoil section flaps of the slotted trailing edge type and is more specially concerned with improvements in the mechanical arrangement of the supporting and operating means of a flap of this type.

These flaps are usually positively operated by means of irreversible mechanical, hydraulic or electric drives, kept under the control of the pilot through a flap lever in the cockpit, and are usually provided with a pressure relief system limiting the operation of these drives to permissible applied loads in order to prevent damage to the flaps and their controls.

Flaps of this type are also usually provided with a door, operated by the flap drive simultaneously with the flap, so as to seal the break in the lower surface of the airfoil and thus maintain an unbroken airfoil contour of the wing during normal flying and, respectively, open the mouth of the Handley-Page slot and close the side thereof along the trailing edge of the fixed portion of the wing when the flap is first extended to form this Handley-Page slot and is then deflected in any of its lift-increasing active positions.

In spite of the above-mentioned pressure relief system, due to the irreversibility of the known flap drives, dangerous flying conditions are created when the pilot forgets to return the flap lever back to neutral at the end of a take-off or, in an approach to a landing, moves prematurely this lever to the desired angle of deflection when still flying at a speed excessive for safe operation of the flaps, because, in the first case, the flap remains deflected in its set position until the pilot corrects this omission and, in the second case, the flap extends rearwardly and tilts down prematurely as far as the relief pressure system will allow before the pilot has had time to slow down his craft to a speed not likely to create these dangerous flying conditions.

It is for this reason that warning signals are in general use to draw the pilot's attention to the fact that the flaps are still down at the end of a take-off and that a warning sign is posted in the cockpit to remind the pilot not to lower the flaps above a given flying speed.

This defect and hazard of the conventional flap mechanisms of this kind becomes specially apparent when, while attempting to land, a pilot realizes that the run is too short or sees an obstacle on the runway and decides to resume his flight. In order to avoid stalling and clear this obstacle, he has then to manipulate several unrelated control devices and may easily omit, among them, the flap lever, thus keeping the flaps down, acting as brakes, at a time where quick recovery of speed is what he needs most.

The main object of the invention is, in order to correct this defect and eliminate this hazard, to organize the supporting and operating means of a flap of this type in such a way that the air load acting on the underside of the flap counteracts the action of the flap power drive with such a mechanical advantage that, at air speeds at which deflected flaps lose their lift effectiveness and, on the contrary, upset the airflow conditions over the fixed portion of the wing and increase unduly the drag, this air load will overcome the action of the drive and thereby positively prevent the deflection of the flaps or effect automatically their retraction at these dangerous air speeds.

I am aware that, in the case of a single full-span flap having its operating mechanism pivoted to the trailing edge of the flap and lodged in the fuselage, it has already been proposed to incorporate in this operating mechanism overload release devices such as pneumatic or spring struts by which, when air loads acting on the flap become excessive, the flap may yield or retract upwardly due to this externally applied overload, while still permitting of automatic extension of the flap when the damaging force has been relieved, but devices of this kind cannot be adapted to the case of slotted trailing edge flaps where the entire flap mechanism has to be wholly lodged within the wing profile in normal flight to safeguard the aerodynamic streamlining of the aircraft.

Problems having reference to flap structure and mechanical operation remain well within the scope of conventional design and the ordinary skill of good aircraft designers as long as the thickness of the wing remains relatively substantial, but their solution, when applied to relatively thin wings, becomes so difficult as to require inventive ability and ideas.

Another object of the present invention is to improve the aerodynamic characteristics of such a lift-increasing device and more particularly to hinge and operate the flap in such a way that its nose point will have to follow closely what is known as "the optimum flap path," (nose point of the flap being here defined as the point of tangency of a line drawn normal to the wing chord and tangent to the leading edge arc of the flap when neutral).

As, in such a lift-increasing device, it is of primary importance that the two flaps operate in perfect synchronism, on the one hand, and as it often occurs, on the other hand, under certain flying conditions, that the air loads acting on one flap are substantially different from the ones acting on the other flap, still another object of the invention is the provision of mechanical synchronizing means, which, normally, force the flaps to move as a unit and in this last case, equalize these different air loads before they act upon the flaps when the flying speed reaches a limit dangerous for flap operation.

A further object of the invention is to enhance the lift-increasing qualities of a flap of this type by providing such a mechanical connection between the flap door mechanism and the flap operating mechanism that the door remains substantially closed during formation of the Handley-Page slot; i. e during the rearward extension of the flap, and that this door starts its motion by a slight swing in the wrong direction in order to clear the passage for the flap.

Further objects and advantages of the invention will appear more fully from the following description, particularly when taken in conjunction with the accompanying drawing, which forms a part thereof and shows, as an illustration, one embodiment of the invention.

In this drawing:

Figure 1 is a fragmentary plan view of an aircraft wing and associated flap, showing the flap mechanism in dotted lines;

Figure 2 is an enlarged cross section made on line 2—2 of Figure 1 and showing the flap in its retracted or neutral position;

Figure 3 is a similar cross section made on line 3—3 of Figure 1 and showing the flap in its extended and fully deflected position, and Figure 4 shows in solid lines and at a larger scale a detail of Figure 1.

Each lateral main section of the wing 5 is provided with an airfoil section flap 6 of the N. A. C. A. slotted trailing edge type. Each flap extends spanwise from the inner end of a wing main section to the inner end of an aileron 7. 6a indicates the flap spar, 6b the point of the nose or leading edge of the flap and 8 the trailing or rear spar of the wing.

Each flap is carried by three trapezoidal-linkage hinges 9, supported by spar 8 inboard, and is operated by means of a double-acting hydraulic cylinder 10, pivoted as at 11 to the second wing spar 12. The pressure line is equipped with a pressure relief valve which limits automatically the load which can be applied upon the flaps.

A triangular operating lever 14 is linked as at 13 to the forked end of the piston working in this cylinder 10 and is pivoted as at 13a to a mast 15, anchored to the flap spar 6a. This operating lever 14 is fixedly mounted on a torque tube 16 extending from a point just inboard of the flap to the intermediate hinge linkage. The left and right torque tubes 16 are interconnected through universal joints 17 by means of a joining torque tube 16a, passing through the fuselage. This short central torque tube 16a acts as a coupling device insuring that the right and left flaps operate constantly in perfect synchronism as a unit.

This coupling device or synchronizing mechanism could be replaced by an hydraulic equalizer (not shown) inserted into the fluid line between the engine pump and the two operating cylinders 10 so as to equalize the pressure into these latter, or a combination of both this mechanical synchronization and this hydraulic equalization could be used.

A reinforcing lever 14a, likewise pivoted as at 13a to an inner mast 15, is also secured on the torque tube 16 to transmit the motion imparted by the operating lever 14 to the inner end of the flap 6 and to protect, in combination with the torque tube 16, the hinges 9 against torsional and shear stresses.

Each trapezoidal-linkage hinge (referred generally as 9 and merely outlined on Figure 1) works between two parallel auxiliary ribs 18 fixed to the spar 8 and is carried by a pair of brackets 19, secured to said ribs and acting also as bearings for the torque tube 16.

Each of these hinges consists of a long rear link 20, pivoted at its upper end 19a to said brackets 19, a short front linke 21, also pivoted at its upper end 19b to said brackets 19 and a swinging arm 22, articulated at one end to the lower ends of these links 20, 21 and pivoted at its other end as at 23a to a bracket 23, carried by the flap spar 6a.

As the links 20, 21 are of unequal length, the pivot 23a is forced to follow a slightly curved path, which is neither an arc of circumference nor a straight line when the links swing about their pivots 19a, 19b. The three pivots 23a are aligned so as to form a pivoting axis located on the flap near the chordline of this latter at about 25% of the chord length rearward of the leading edge 6b of the flap and forward with respect to the center of pressure of the flap (not shown).

A door 24 closes normally the gap between the leading edge 6b of each flap 6 and the lower part of the trailing edge of the wing 5 when the flap is in its neutral position (Figure 2) and swings so as to open the mouth of the Handley-Page slot and close the gap created in the thickness of the trailing edge of the wing when the flap is deflected. (Figure 3.) In this manner, when the flaps are up, there is no break in the lower surface of the airfoil constituted by the wing 5 and the flap 6 and, respectively, no break in the trailing edge of the wing when the flaps are deflected.

This door 14 is pivoted near its forward edge as at 25 to the ribs 18 and is mechanically connected, through a connecting rod 26 of adjustable length and a bellcrank 27, with the pivot 19b so as to be operated by the flap operating mechanism synchronously with the flaps. This mechanical connection between the hinges of the flap and the door 24 is such that the door remains substantially closed during the rearward extension of the flap to form the Handley-Page slot, in order to reduce the drag, then swings first down slightly to give passage to the flap and then swings up in the gap just opened by the flap as long as this latter swings down, these relative motions of the door and the flap being reversed during the retraction of the flap in its neutral position.

A conventional full-span fixed lip 5a, made of strip brass, is located on the upper surface of the wing over the flat slot exit to seal the slot when the flap is neutral and to direct the passage of air downward over the flap when this latter is deflected.

The flaps 6 have no external stops and their movement up or down is limited by the internal stops (not shown) determining the stroke of the pistons inside the two hydraulic operating cylinders 10. The length of this piston stroke may be readily adjusted by any suitable and conventional means (not shown). These cylinders 10 can be actuated by either the engine hydraulic pump or the hand hydraulic pump. A conventional hand control lever for these cylinders is located in the cockpit and is arranged for deflecting and holding the flaps at any desirable downward flap deflection comprised between 0° and 40°.

This flap operating mechanism operates as follows:

When taking off the pilot brings the flaps down to the desired deflection angle by moving the control lever to the corresponding down position. As long as he is busy with the multiple controls necessary to complete the take-off, he can dispense with any further attention to the flaps, as these latter start to retract gradually from this set position as soon as the aircraft attains flying speed, thereby reducing the drag and permitting fast acceleration. He can even postpone to bring the flap lever back in neutral until after he has reached full cruising speed as, long before that time, the flaps have been automatically retracted under the action of the air loads thereon to a low angle of deflection at which they do not create any dangerous flying conditions. If the pilot does not contemplate making acrobatics, including stiff climbs and dives, he can even leave the control lever in this down position, ready for landing, during his entire flight because the normal speed in flight will then be constantly well above the speed limit determined by the mechanical advantage according to the present invention for automatic retraction of the flaps.

In that case he will naturally be dispensed from paying any attention to the flap lever during his next landing, as the flaps will then be automatically deflected as soon as his flying speed is slowed down below this speed limit.

When the pilot has, contradistinctly, brought the flap lever back into normal at the end of the take-off, thanks to the mechanical advantage object of the present invention, he can then, without risk, set the flap lever in the desired down position in advance, i. e. before making any other preparation to a landing and before starting to slow his speed down. As soon as he starts slowing down this speed, there will be thereafter a constant and progressively balanced interaction between the resulting decrease of air loads on the flaps and the constant hydraulic pressure acting in the operating cylinders of the flaps, the former tending to deflect gradually the flaps and the latter increasing the drag and making the flaps act as brakes and thus helping the pilot to slow down progressively the plane.

Another advantage made possible by the use of the flap mechanism, according to the present invention, is that the pilot will thus be relieved of one task at the busy time of leveling-off and that, in case he misses his projected landing and has to resume his flight, he can omit handling the flap lever back in neutral if he is too busy otherwise without thereby creating the hazardous flying conditions that would otherwise prevail under such conditions if he were using a conventional flap mechanism.

While I have described my invention in detail in its present preferred embodiment, it will be obvious to those skilled in the art that various changes and modifications may be made therein without departing from the spirit or scope thereof as defined by the following claims:

I claim:

1. The combination with an aircraft wing, of a flap cooperating therewith and having a spar, a pair of parallel ribs within the wing, an elongated bracket secured to each rib, the bracket on one rib being aligned with that of the other rib, rear and front hinge pivots mounted between said brackets, a relatively short link pivoted to said front hinge pivot, a relatively long link pivoted to said rear hinge pivot, a U-bracket secured to the spar of the flap, a pivot pin mounted in said bracket, a connecting arm pivoted at one end to said short link, at its opposite end to said pivot pin and intermediate its ends to the long link, and power means to operate said flap.

2. The combination with an aircraft having a fixed wing, of a movable auxiliary airfoil associated with the trailing edge of said wing, means for mounting said airfoil for movement with respect to said trailing edge along a predetermined path, comprising two spaced links of unequal length pivoted to said fixed wing, a connecting arm pivotally connected to each of said links and to said airfoil, a mast fixed to said airfoil, an operating lever pivoted to said fixed wing and to said mast, and power means acting on the pivotal connection between the lever and the mast.

3. The combination with a fixed aircraft wing, of an auxiliary movable airfoil adjustable in position with respect to the trailing edge of said wing, a torque tube pivotally mounted in said wing adjacent and parallel to its trailing edge, a mast fixed to said airfoil, an operating lever pivotally secured to said mast and fixed to said torque tube, an articulated supporting hinge comprising two pivots spaced transversely of the wing and carried thereby on opposite sides of said torque tube, two links of unequal length pivotally mounted on said pivots, a bracket secured to said airfoil, and a connecting arm pivoted to said links and to said bracket, and means to apply power to the operating lever to displace the flap with respect to the trailing edge of the wing along a path determined by the links aforesaid.

4. The combination with an aircraft having a fixed wing and an auxiliary movable airfoil coacting with the trailing edge of said wing, a means for mounting said airfoil for movement with respect to said trailing edge along a predetermined path comprising a pair of pivots spaced transversely of said wing, two links of unequal length movably suspended from said pivots, a pair of pivotal connections carried by said airfoil, and a connecting arm pivoted to the lower extremity of each of said links and to one of said pivotal connections, means for applying power to said mounting means for moving the airfoil as aforesaid, and a mechanism including a link between the latter means and the other of said pivotal connections movable into and out of alignment therewith.

5. The combination with a fixed aircraft wing, of an auxiliary movable airfoil including a mast coacting with the trailing edge thereof, a pair of pivots spaced transversely of the wing, a pair of links movably mounted on said pivots the forward of said links being shorter than the rearward thereof, an arm pivoted at its inner end with the extremity of the shorter of said links and adjoining its inner end to the extremity of the other of said links, a pivotal connection between the outer extremity of the arm and the airfoil, power applying means, and a pivotal lever connecting said power applying means to said mast to swing into and out of alignment with the mast.

6. The combination with a fixed aircraft wing, of an auxiliary movable airfoil coacting with the trailing edge thereof, a pair of pivots spaced transversely of the wing adjacent to its upper skin, a pair of links movably suspended from said pivots, the forward of said links being shorter than the rearward link, an arm pivoted at its inner end to the extremity of the shorter of said links, and pivoted adjoining its inner end to the extremity of the other of said links, a pivotal connection between the outer end of said arm and the airfoil, and means for moving said airfoil pivotally connected to the leading edge of the airfoil forward of the connection between the arm and the airfoil.

7. The combination with fixed aircraft wing, of an auxiliary movable airfoil, a pair of pivots spaced transversely of the wing adjacent its upper skin, the rearward of said pivots being positioned outside the profile of the wing, a pair of links movably suspended from said pivots, the forward of said links being shorter than the rearward thereof, a connecting arm pivoted at its inner end to the shorter of said links and pivoted adjoining its inner end to the longer of said links, a pivotal connection between the outer extremity of said arm and the airfoil positioned adjacent the lower skin of the airfoil and at a point removed from the leading edge of said airfoil, a second pivotal connection at and forward of the leading edge of the airfoil, and means cooperating with the last said pivotal connection for operating said airfoil.

ARTHUR HAROLD WESTBERG.